United States Patent
Hsu et al.

(10) Patent No.: US 9,456,227 B2
(45) Date of Patent: Sep. 27, 2016

(54) VIDEO CAPTURE SYSTEM AND VIDEO CAPTURE METHOD THEREOF

(71) Applicant: INSTITUTE FOR INFORMATION INDUSTRY, Taipei (TW)

(72) Inventors: Chih Yao Hsu, Taipei (TW); Han-Lin Wang, Nantou County (TW); Wenshan Liou, New Taipei (TW); Youlian Huang, Taoyuan County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 14/597,542

(22) Filed: Jan. 15, 2015

(65) Prior Publication Data

US 2016/0100203 A1    Apr. 7, 2016

(30) Foreign Application Priority Data

Oct. 6, 2014   (TW) .............................. 103134773 A (51) Int. Cl.
*H04N 7/173* (2011.01)
*H04N 21/234* (2011.01)
*H04N 21/233* (2011.01)
*H04N 21/239* (2011.01)
*H04N 21/482* (2011.01)
*H04N 21/433* (2011.01)
*H04N 21/41* (2011.01)
*H04N 21/845* (2011.01)

(52) U.S. Cl.
CPC ...... *H04N 21/23418* (2013.01); *H04N 21/233* (2013.01); *H04N 21/2393* (2013.01); *H04N 21/4126* (2013.01); *H04N 21/4334* (2013.01); *H04N 21/482* (2013.01); *H04N 21/8455* (2013.01)

(58) Field of Classification Search
CPC ............. H04N 21/232; H04N 21/237; H04N 21/25891; H04N 21/2747; H04N 21/278; H04N 21/4126; H04N 21/42203; H04N 21/4394; H04N 21/44222
USPC ............................. 725/13, 87, 133, 141, 153
See application file for complete search history.

(56) References Cited

U.S. PATENT DOCUMENTS

| | | |
|---|---|---|
| 2004/0223737 A1 | 11/2004 | Johnson |
| 2007/0244903 A1* | 10/2007 | Ratliff ............... G06F 17/30038 |
| 2011/0289098 A1 | 11/2011 | Oztaskent et al. |
| 2011/0306786 A1 | 12/2011 | Perret |
| 2012/0315014 A1 | 12/2012 | Shuster |

FOREIGN PATENT DOCUMENTS

JP    2009147775 A    7/2009

OTHER PUBLICATIONS

Taiwan Patent Office, Office action issued on Mar. 28, 2016.

* cited by examiner

*Primary Examiner* — Dominic D Saltarelli
(74) *Attorney, Agent, or Firm* — Li & Cai Intellectual Property (USA) Office (57) ABSTRACT

The present disclosure illustrates a video capture system. The video capture system comprises a smart device and a first server. The smart device is configured to detect a user specific action. When the smart device detects the user specific actions, the smart device records a time stamp of the user specific action, and generate an audio fingerprint data based on a audio data of a specific television program showed on a display. The first server receives the time stamp and the audio fingerprint data, and finds the specific television program corresponding to the audio fingerprint data according to the audio fingerprint data and electronic program guide information. Then, the first server obtains a start tag based onbased on the time stamp. The start tag is a starting time of a video fragment.

20 Claims, 9 Drawing Sheets

VIDEO CAPTURE SYSTEM AND VIDEO CAPTURE METHOD THEREOF

BACKGROUND

1. Technical Field

The present disclosure relates to a video capture method, more particularly to a video capture method which utilizes a smart device to detect user's action to capture a video fragment of a specific television program which a display device is showing, and system using the same.

2. Description of Related Art

With the coming of the digital generation, various video data and audio data can be stored, transmitted and broadcasted more conveniently. In the current science and technology, the user can watch television programs provided by TV stations, via a display device (such as television, or a screen of a computer system equipped with TV card), and record the video fragment which the user likes.

For example, when the user watches a specific television program and finds the video fragment which the user likes, such as a video fragment of the goal in a sports television program or delicious food information in a cooking or food program, the user can press any button of a smart device (or remote controller of the display device) having a video capture program, to enable the smart device to start recording sound for further getting audio fingerprint data. Next, after the first server receives the audio fingerprint data, the first server compares the audio fingerprint data with complete audio data of all television programs stored, to find the specific television program corresponding to the audio fingerprint data. The first server establishes a bookmark based on the audio fingerprint data. The bookmark includes a start tag and an end tag of the video fragment which the user wants to capture. The first server obtains the video fragment of the corresponding specific television program from the second server according to the bookmark. After the first server obtains the video fragment, the first server returns the video fragment to the user.

However, the user is required to complete several actions in the current method of getting video fragment. First, before watching the specific television program, the user must activate the video capture program of the smart device and assign the channel of the specific television program which the user wants to watch. Further, before capturing the video fragment, the user must utilize the audio fingerprint comparison technology to enable a timeline of the smart device to synchronize with that of the television program. While the user capturing video capture, the user must manually control the start tag and the end tag of the video fragment which the user wants to capture. In other words, before providing the video fragment which the user wants, current technology requires the user to execute miscellaneous actions. On the other hand, the first server is stored with complete audio data of all television programs, which causes a mass of storage space of the first server to be consumed. When the first server establishes the bookmark based on the audio fingerprint data, the first server must compare the audio fingerprint data with a mass of audio data to correspondingly establish the bookmark.

Therefore, what is needed is a video capture method and a video capture system using the same which can synchronize with the television program automatically and provide the user a quick, simple and convenient video capture service, and also reduce the data amount stored in the first server.

SUMMARY

The embodiment of the present disclosure provides a video capture system. The video capture system comprises a smart device and a first server. The smart device is configured to detect a user specific action. When the smart device detects the user specific action, the smart device records a time stamp of the user specific action, and generates an audio fingerprint data based on an audio data of a specific television program showed on a display device. The first server is configured for receiving the time stamp and the audio fingerprint data, and finding the specific television program corresponding to the audio fingerprint data according to the audio fingerprint data and the electronic program guide information. Then, the first server obtains a start tag based onbased on the time stamp. The start tag is a starting time of a video fragment.

Embodiment of the present disclosure provides a video capture method. The video capture method is adapted for a video capture system, and the video capture system includes a smart device and a first server. The video capture method includes the following steps. At the smart device, a user specific action is detected. When the smart device detects the user specific action, the smart device records a time stamp of the user specific action, and generate an audio fingerprint data based on an audio data of a specific television program showed on a display device. At the first server, the time stamp and the audio fingerprint data are received and the specific television program corresponding to the audio fingerprint data is found according to the audio fingerprint data and electronic program guide information. At the first server, a start tag based onbased on time stamp is obtained. The start tag is a starting time of the video fragment.

According to the above-mentioned content, the video capture method and the system using the same provided by the embodiment of the present disclosure can allow the user to control the smart device to generate the video capture request information, and further obtain the video fragment which the user wants, without complicated operation. On the other hand, by using the electronic program guide information, and the time stamp and the audio fingerprint data in the video capture request information, the first server can quickly find the specific television program which the user is watching. Therefore, the consumption of time by the user waiting for obtaining the video fragment can be reduced. It is worth mentioning that the first server need not store complete audio data of all television programs, and can just reserve the latest N minutes of the audio data of all television programs for finding the specific television program corresponding to the audio fingerprint data. N is larger than zero. Compared with the prior art, the video capture method and the system using the same of the present disclosure further reduces the storage space for all television programs in the first server.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification.

The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. However, they may be embodied in different forms and should not be construed as limited to the embodiments set forth herein. These embodiments are provided so that this disclosure will be thorough and complete, and will fully convey the inventive concept to those skilled in the art. In the drawings, the thickness and relative thickness of layers and regions may be exaggerated for clarity. Similar constituent elements are generally designated with the same reference numerals throughout the specification.

It will be understood that, although the terms 'first', 'second', 'third', etc., may be used herein to describe various elements or signal, etc., these elements or signals should not be limited by these terms. The terms are used only for the purpose of distinguishing one component from another component, or one signal from another signal. In addition, as used herein, the term "or" includes any and all combinations of one or more of the associated listed items.

Figure 1:
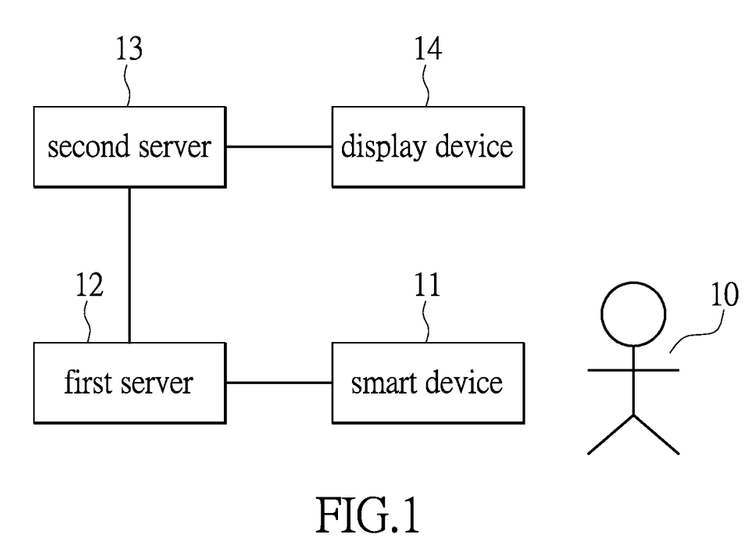
FIG. 1 is a block diagram of a video capture system of an embodiment of the present disclosure.

Please refer to FIG. 1 which is a block diagram of a video capture system of an embodiment of the present disclosure. The video capture system includes a smart device 11, a first server 12, a second server 13 and a display device 14. Preferably, the smart device 11 and the first server 12 are linked with each other via wireless communication, the first server 12 and the second server 13 are linked with each other via wireless communication, and the second server 13 and the display device 14 are linked with each other via wireless communication. It should be noted that the smart device 11 and first server 12, the first server 12 and the second server 13, the second server 13 and the display device 14 can be respectively linked with each other via wired communication. In addition, some devices in the video capture system even can be linked with each other via wireless communication, and other devices are linked with each other via the wired communication approach. The present disclosure is not limited to the manner of connection between devices.

The smart device 11, such as a smart phone, a tablet computer or a set-top box, is equipped with a sensor and a microphone for detecting a user specific action. In detail, the smart device 11 has installed a video capture program. After the video capture program of the smart device 11 detects the user specific action, the smart device 11 records the time stamp $T_s$ of the user specific action at current time, generate an audio fingerprint data $V_p$ based on a audio data of a specific television program $D_p$ showed on the display device 14. Next, the smart device 11 generates video capture request information. The video capture request information includes the time stamp $T_s$ and the audio fingerprint data $V_p$.

The user specific action can be an action of shaking the smart device 11, or beating the smart device 11, or emitting a specific sound to the smart device 11 by the user 10, for example, the user can clap three times or say [video capture]. However, the present disclosure is not limited to the types of the user specific actions. Upon demand, the user 10 can configure what kind of the action or sound the smart device 11 detects to start recording the time stamp $T_s$ corresponding to the current point, and generate the audio fingerprint data $V_p$ based on the audio data of the specific television program $D_p$ showed on the display device 14.

The first server 12 is configured for receiving the video capture request information, and finding the specific television program $D_p$ corresponding to the audio fingerprint data $V_p$ according to the audio fingerprint data $V_p$ and EPG information, the specific television program is the specific television program $D_p$ which the user 10 is watching. The electronic program guide information contains the information related to the television program which the display device 14 is showing, and the information related to the television program to be shown in the future, for example, the information can be a program title, a channel, a timetable or a program type and so on. Therefore, the first server 12 can find the audio data of all television programs which the display device 14 is showing.

The first server 12 performs an audio fingerprint comparison on the audio data of all television programs and the audio fingerprint data $V_p$, to find the specific television program $D_p$ corresponding to the audio fingerprint data $V_p$. If the first server 12 does not find the specific television program $D_p$ corresponding to the audio fingerprint data $V_p$, the first server 12 notices the user 10 that no specific television program $D_p$ corresponding to the audio fingerprint data $V_p$ is found. If the first server 12 finds the specific television program $D_p$ corresponding to the audio fingerprint data $V_p$, the first server 12 obtains the start tag $T_{start}$ based on time stamp $T_s$. Next, the first server 12 determines an end tag $T_{end}$ according to a video capture rule. After the start tag $T_{start}$ and the end tag $T_{end}$ are determined, the first server 12 outputs the start tag $T_{start}$, the end tag $T_{end}$ and the information related to the specific television program $D_p$ to the second server 13, to obtain a corresponding video fragment $D_v$. The start tag $T_{start}$ and the end tag $T_{end}$ respectively indicate a starting time and an ending time of the video fragment which the user wants to capture in the specific television program $D_p$.

It is worth mentioning that the first server 12 just reserves N minutes of the audio data of all television programs, N is larger than zero. The first server 12 compares the audio fingerprint data $V_p$ with the latest N minutes of the audio data of all television programs, to find the specific television program $D_p$ corresponding to the audio fingerprint data $V_p$.

In this embodiment, N is preferred to be one. However, N is not limited in the present disclosure, the user 10 can configure the first server 12 to reserve the latest several minutes of the audio data of all television programs upon demand.

The second server 13 is configured for storing and providing television signals of the television program which should be shown in channels, to the display device 14. The television signal can be an analog television signal, a digital television signal, a wired television signal, a wireless television signal, a satellite television signal, a network television signal or a broadband television signal. The second server 13 receives the start tag $T_{start}$, the end tag $T_{end}$ and the information related to specific television program $D_p$ outputted by the first server 12, and then correspondingly captures the video fragment $D_v$ of the specific television program $D_p$ according to the start tag $T_{start}$, the end tag $T_{end}$ and the information related to specific television program $D_p$, and then transmits the video fragment $D_v$ to the first server 12.

The display device 14, such as television or a screen of a computer system equipped with a television card, is configured for receiving the television signal outputted by the second server 13, and shows the specific television program $D_p$ correspondingly.

When the user 10 starts to watch the specific television program $D_p$, the user 10 operates the smart device 11 first and activates the video capture program to detect the user specific action. It is worth mentioning that in this embodiment the smart device 11 is preferred to be a smart phone or a tablet computer, but the present disclosure is not limited thereto. The smart device 11 can also be a set-top box. After the smart device 11 detects the user specific action, the smart device 11 records the time stamp $T_s$ at the current time and generates the audio fingerprint data $V_p$ based on the audio data of the specific television program $D_p$ which the display device 14 is showed on the display device 14. Next, the smart device 11 generates video capture request information. The video capture request information includes the time stamp $T_s$ and the audio fingerprint data $V_p$.

Figure 2:
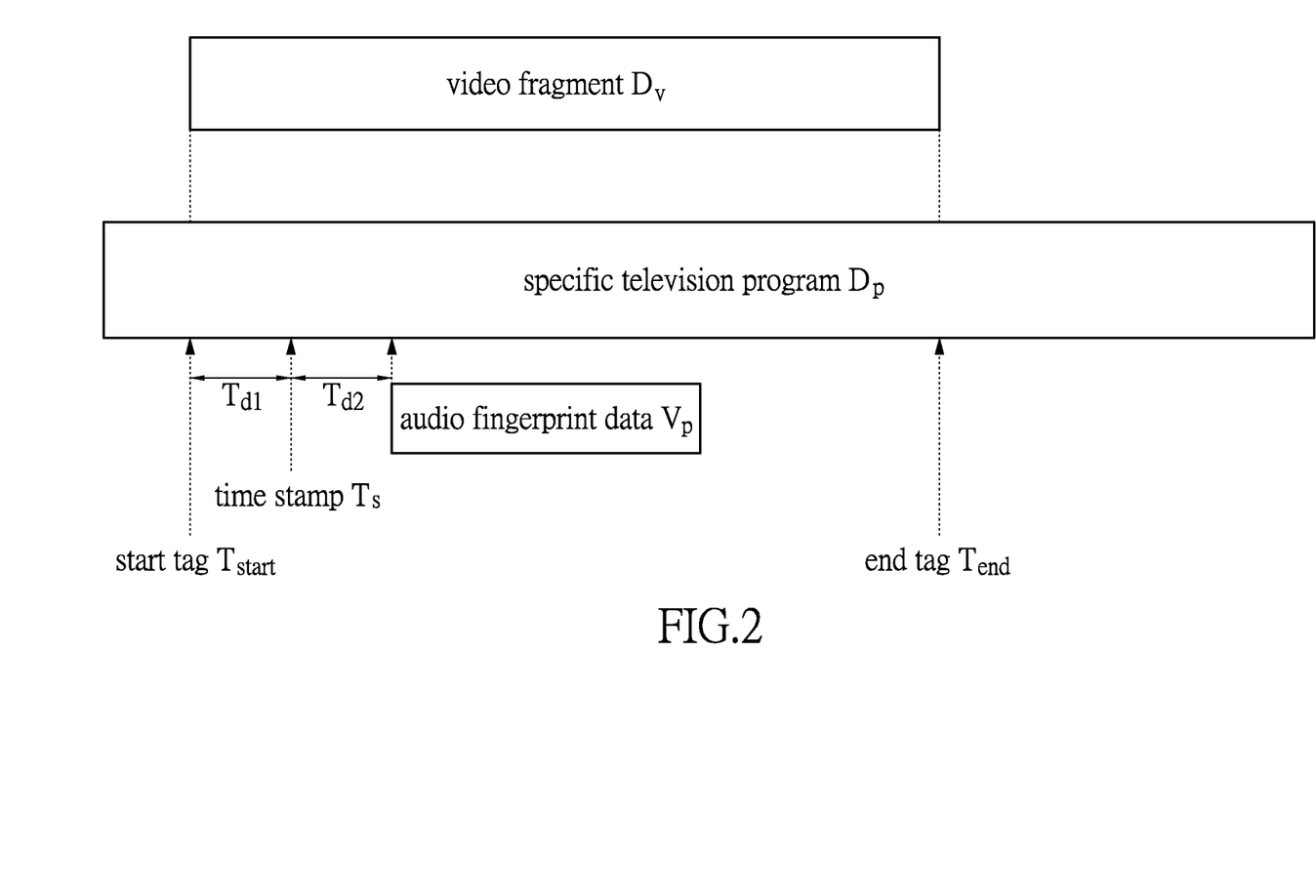
FIG. 2 is a schematic view of video fragment capture of the embodiment of the present disclosure.

Please refer to FIG. 2 which is a schematic view of video fragment capture of an embodiment of the present disclosure. When the first server 12 receives the video capture request information, the first server 12 firstly obtains latest N minutes of the audio data of all television programs according to the electronic program guide information. The first server 12 compares the audio fingerprint data $V_p$ with the latest N minutes of the audio data of all television programs, to find the specific television program $D_p$ corresponding to the audio fingerprint data $V_p$, from the all television programs.

Next, the first server 12 detects the start tag $T_{start}$ based on the time stamp $T_s$. In detail, the first server 12 traces back the time stamp $T_s$ to a predetermined user response time $T_{d1}$ ago, for use as the start tag $T_{start}$. The predetermined user response time $T_{d1}$ is a time difference between a time point of the user specific action to a time point of the smart device 11 recording the time stamp $T_s$. The predetermined user response time $T_{d1}$ may be 1 second, 2 seconds or less than 1 second. The user 10 can set the length of the predetermined user's response time $T_{d1}$ in advance, and record the length of the predetermined user response time $T_{d1}$ in the first server 12. In the present disclosure, the length of the predetermined user response time $T_{d1}$ is not limited.

It is worth mentioning that the first server 12 does not use the starting time point of the audio fingerprint data $V_p$ as the start tag $T_{start}$ because the starting time point of the audio fingerprint data $V_p$ must be traced back to a predetermined user response time $T_{d1}$ and a sound recording delay time $T_{d2}$ ago for completely capturing the video fragment $D_v$ which the user 10 wants to capture. The sound recording delay time $T_{d2}$ is the time difference between a time point of the smart device 11 recording the time stamp $T_s$ and a time point of the smart device 11 starting to record sound. Because the time stamp $T_s$ is the time point of detecting the user specific action, the start tag $T_{start}$ is the time point obtained by tracing back the time stamp $T_s$ to a predetermined user's response time $T_{d1}$ ago. Therefore, the sound recording delay time $T_{d2}$ cannot be taken into consideration.

After the start tag $T_{start}$ is detected, the first server 12 determines the end tag $T_{end}$ according to the video capture rule. The video capture rule can be classified into two types, one is constant length capture rule, and the other is smart length capture rule.

Figure 3A:
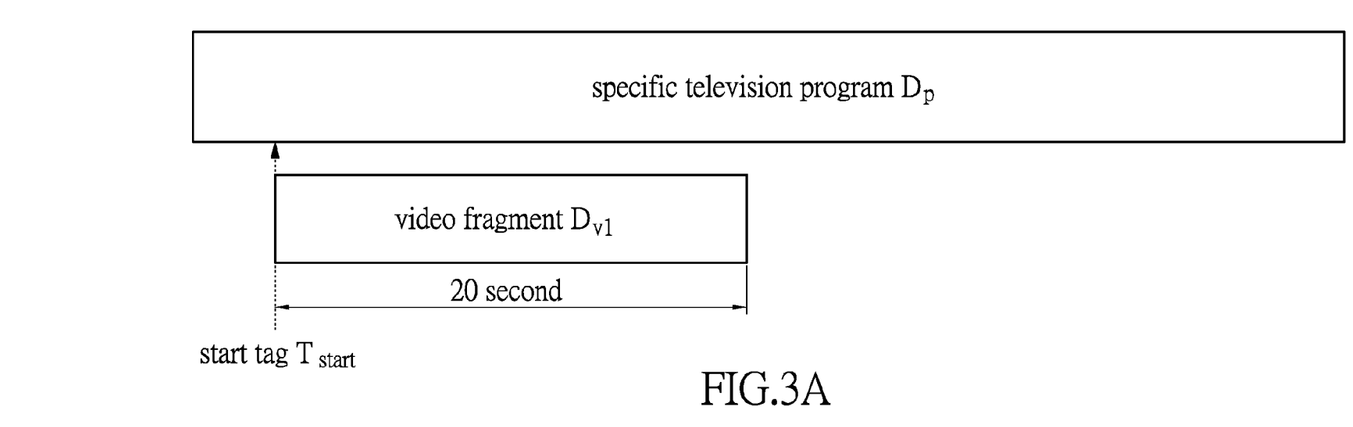
FIG. 3A is a schematic view of constant length capture rule of an embodiment of the present disclosure.

Please refer to FIG. 3A which is a schematic view of the constant length capture rule of the embodiment of the present disclosure. When the user 10 selects the constant length capture rule, the end tag $T_{end}$ is generated by adding a constant length of time with the start tag $T_{start}$. In other words, no matter what kind of television program the user 10 is watching, the length of the video fragment $D_{v1}$ obtained by the first server 12 is constant.

For example, after the first server 12 obtains the start tag $T_{start}$, the first server 12 adds the start tag $T_{start}$ with 20 seconds for use as the end tag $T_{end}$, it means that the first server 12 requests the second server 13 for the 20 seconds of video fragment $D_{v1}$. It should note that the aforesaid aspect is just taken as an example, but the present disclosure is not limited thereto. While the user 10 selects the constant length capture rule for operating the video capture program, the user can set the length of the video fragment $D_{v1}$ to be captured, at the same time.

Figure 3B:
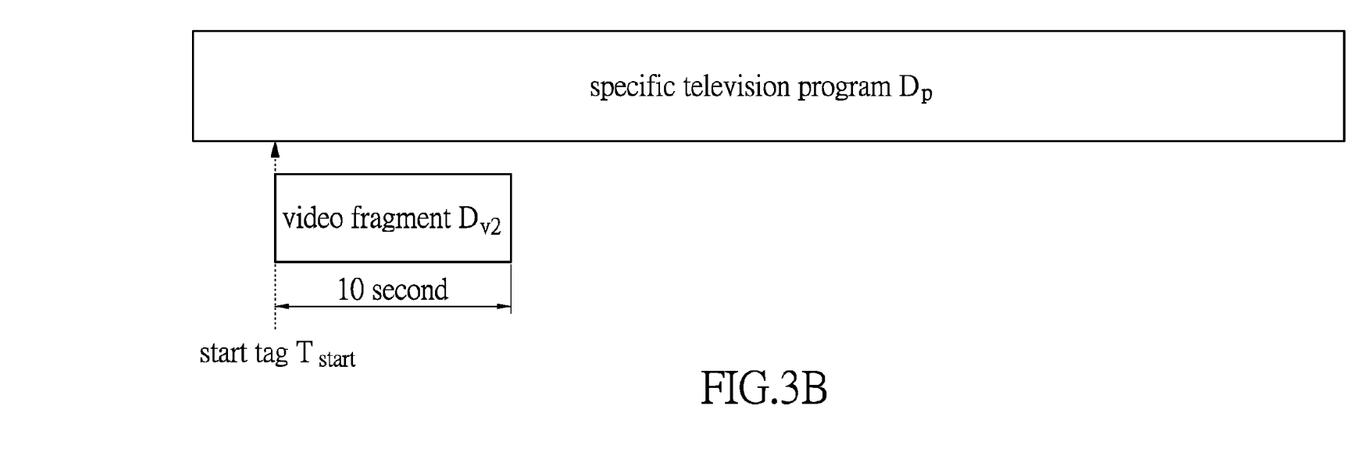
FIG. 3B is a schematic view of a smart length capture rule of other embodiment of the present disclosure.

Please refer to FIG. 3B which is a schematic view of the smart length capture rule of another embodiment of the present disclosure. When the user 10 selects the smart length capture rule, the first server 12 correspondingly determines the end tag $T_{end}$ according to the program type of the specific television program $D_p$ recorded in the electronic program guide information. For example, when the user 10 is watching dynamic television program, such as a sport type of television program, the user may just want to capture the video fragment of the goal or marvelous action, so the first server 12 only captures a small length of the video fragment $D_2$, for example, the start tag $T_{start}$ is added with 10 seconds for use as the end tag $T_{end}$. It should note that the user 10 can select the smart length capture rule for operating the video capture program, and set the length of the video fragment $D_{v2}$ to be captured according to program type. In the present disclosure, the design of smart length capture rule is not limited.

Figure 3C:
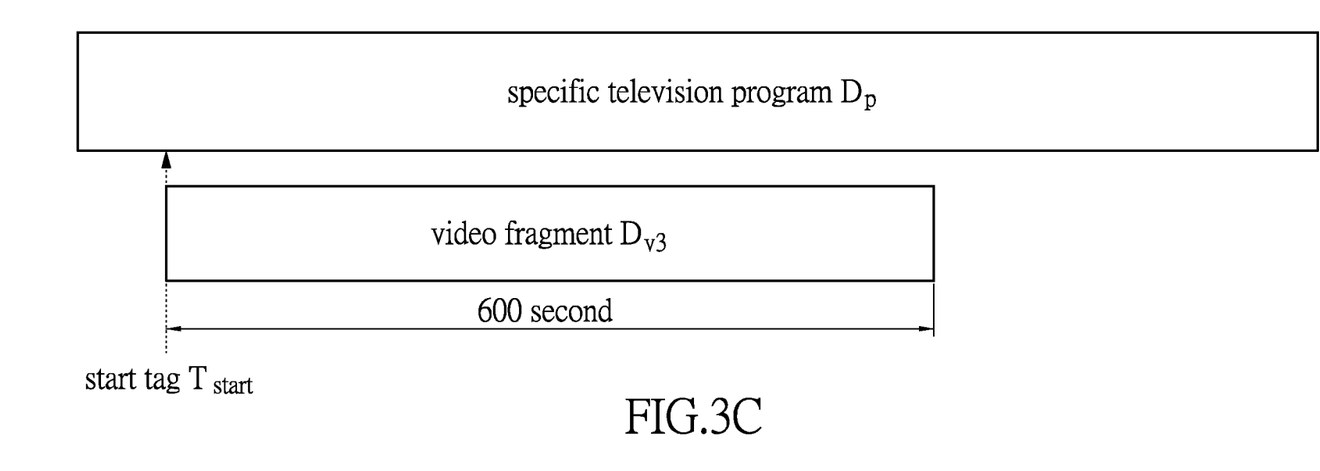
FIG. 3C is a schematic view of a smart length capture rule of another embodiment of the present disclosure.

Please refer to FIG. 3C which is a schematic view of the smart length capture rule of another embodiment of the present disclosure. In this embodiment, the user 10 also selects the smart length capture rule. The difference between the embodiment of the FIG. 3B and the embodiment of the FIG. 3C is that the user 10 is watching a static television program, such as talking program, cooking or food program, entertainment program or TV series, etc. In this case the first server 12 will capture several minutes or dozens of minutes of video fragment $D_{v3}$. Similarly, the user 10 can select the smart length capture rule for operating video capture program, and at the same time set the length of the video fragment $D_{v3}$ to be captured according to program type. In the present disclosure the design of smart length capture rule is not limited.

After the start tag $T_{start}$ and the end tag $T_{end}$ are determined, the first server 12 outputs the start tag $T_{start}$, the end tag $T_{end}$ and information related to the specific television program $D_p$ to the second server 13. The second server 13 captures a length of video fragment $D_v$ according to the start tag $T_{start}$, the end tag $T_{end}$ and the information related to the specific television program $D_p$ correspondingly, and returns the video fragment $D_v$ to the first server 12.

After receiving the video fragment $D_v$, the first server 12 notices the user 10 that it has succeeded in capturing the video fragment $D_v$, and provides for the user 10 to perform subsequent actions. In detail, the first server 12 further provides a user interface (not shown in FIGs), the user 10 can log in the first server 12 via the user interface, and watch the captured video fragment $D_v$, edit the captured range of the video fragment $D_v$, or perform other editing action on the video fragment $D_v$. For example, if the user 10 thinks that the captured video fragment $D_v$ is not the video fragment which the user 10 wants to capture, the user 10 can delete the video fragment $D_v$. Or, the user 10 can edit the captured range of the video fragment $D_v$ to enable the first server 12 to generate a new start tag $T_{start}$ and a new end tag $T_{end}$, and then obtain a new video fragment $D'_v$ from the second server 13. Or, the user 10 can operate the first server 12 to transmit the video fragment $D_v$ to the smart device 11.

It is worth mentioning that the user 10 can also configure the video capture program of the smart device 11 to enable the first server 12 returning the video fragment $D_v$ to the smart device 11 upon the receipt of the video fragment $D_v$ from the second server 13. The user 10 can configure, upon demand, whether the first server 12 returns the video fragment $D_v$ to the smart device 11 upon receipt of the video fragment $D_v$. However, the present disclosure is not limited to whether the video fragment $D_v$ must be returned to the smart device 11.

In the previous embodiments, the video capture program of the smart device 11 outputs the video capture request information after detecting the user specific action. The first server 12 finds the specific television program $D_p$ corresponding to the audio fingerprint data $V_p$ according to the electronic program guide information, and the audio fingerprint data $V_p$ of the video capture request information. However, in other embodiments of the present disclosure, the video capture program records a length of the audio data of the specific television program $D_p$ showed on the display device 14, at intervals of constant time (such as 20 seconds), and then generates the audio fingerprint data $V_p$ based on the recorded audio data, and outputs the audio fingerprint data $V_p$ to the first server 12.

In detail, after the user 10 starts to watch the specific television program $D_{p1}$ and activates the video capture program, the smart device 11 records a length of the audio data of the specific television program $D_{p1}$ first, and then generates the audio fingerprint data $V_{p1}$ according to the recorded audio data. After the smart device 11 outputs the audio fingerprint data $V_{p1}$ to the first server 12, the smart device 11 starts to detect the user specific action. In this embodiment, it is worth mentioning that the smart device 11 is preferred to be a set-top box in consideration of electric power consumption, however, the present disclosure is not limited thereto, the smart device 11 can also be a smart phone or a tablet computer.

After the first server 12 receives the audio fingerprint data $V_{p1}$, the first server 12 finds the specific television program $D_{p1}$ corresponding to the audio fingerprint data $V_{p1}$ according to the audio fingerprint data $V_{p1}$ and the electronic program guide information, and records the specific television program $D_{p1}$ found.

After a length of constant time (such as 20 seconds), the smart device 11 again records a length of the audio data of the specific television program $D_{p2}$ which the display device is showing, the specific television program $D_{p2}$ may be the same as the specific television program $D_{p1}$, or may be different from the specific television program $D_{p1}$. The smart device 11 then generates an audio fingerprint data $V_{p2}$ based on the recorded audio data. Next, the smart device 11 outputs the audio fingerprint data $V_{p2}$ to the first server 12, and detects the user specific action. After the first server 12 receives the audio fingerprint data $V_{p2}$, the first server 12 finds the specific television program $D_{p2}$ corresponding to the audio fingerprint data $V_{p2}$ from multiple television programs according to the audio fingerprint data $V_{p2}$ and the electronic program guide information, and records the found specific television program $D_{p2}$.

In other words, the smart device 11 will output the audio fingerprint data $V_p$ to the first server 12 at intervals of the constant time, to enable the first server 12 to periodically compare and check the specific television program $D_p$ which the user is watching, and record the specific television program $D_p$ which the user is watching.

After the smart device 11 detects the user specific action, the smart device 11 records the time stamp $T_s$ of detecting the user specific action. Next, the smart device 11 transmits the video capture request information to the first server 12. In this embodiment, it should be noted that the video capture request information includes the time stamp $T_s$, but does not include any audio fingerprint data $V_p$ (such as the audio fingerprint data $V_{p1}$ or $V_{p2}$).

After the first server 12 receives the video capture request information, the first server 12 can immediately find the specific television program $D_p$ corresponding to the audio fingerprint data $V_p$ without performing the audio fingerprint comparison again. The first server 12 can directly determine the specific television program $D_p$ according to the latest comparison, and determine the start tag $T_{start}$ based on time stamp $T_s$. Therefore, the total time consumed in capturing the video fragment $D_v$ can be reduced.

In this embodiment, it is worth mentioning that the smart device 11 outputs the audio fingerprint data $V_p$ to the first server 12 at intervals of 20 seconds, meaning that the first server 12 compares and checks the specific television program $D_p$ which the user is watching at intervals of 20 seconds, and records the specific television program $D_p$ which the user is watching. However, the present disclosure is not limited to how many seconds the smart device 11 outputs the audio fingerprint data $V_p$ to the first server 12.

Figure 4:
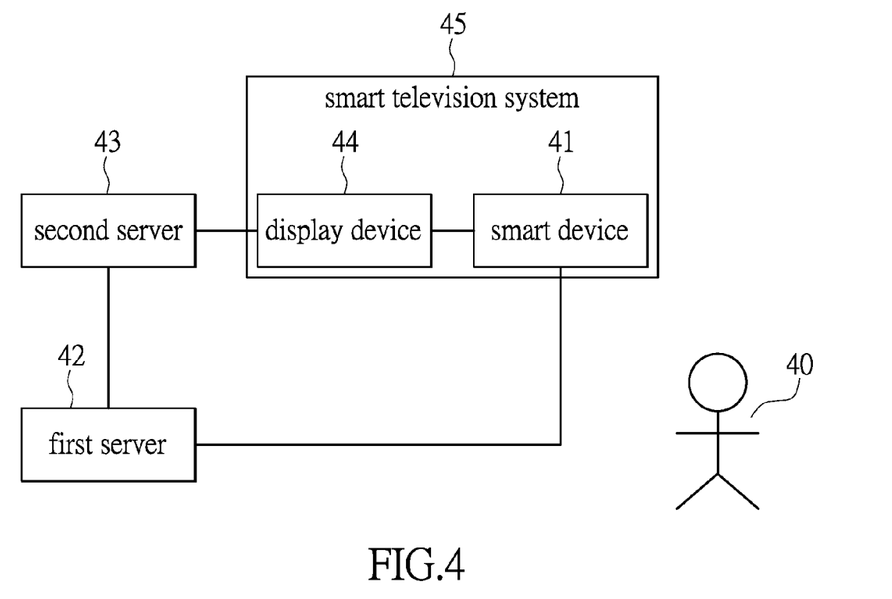
FIG. 4 is a block diagram of a video capture system of another embodiment of the present disclosure.

Please refer to FIG. 4 which is a block diagram of a video capture system of another embodiment of the present disclosure. These components and their connect relationships in the video capture system of FIG. 4 are the same as that shown in FIG. 1, so their detailed description is omitted. The following description just illustrates the differences between the FIG. 1 and FIG. 4. In this embodiment, the smart device 41 and the display device 44 are equipped in the smart television system 45, and the smart device 41 and the display device 44 are linked with each other via wireless or wired communication. The smart device 41, such as a set-top box having a sensor and a microphone, is configured for detecting the user specific action.

Similar to the embodiment of the FIG. 1, after the smart device 41 detects the user specific action, the smart device 41 records the time stamp $T_s$ at the current time and generate the audio fingerprint data $V_p$ based on the audio data of the specific television program $D_p$ showed on the display device 44. Next, the smart device 41 outputs the time stamp $T_s$ and the audio fingerprint data $V_p$ to the first server 42, whereby the first server 42 can obtain the corresponding video fragment $D_v$ according to the time stamp $T_s$, the audio fingerprint data $V_p$ and the electronic program guide information.

Similar to the above-mentioned smart device 11, it is worth mentioning that the smart device 41 of this embodiment records the time stamp $T_s$ at the current time and generate the audio fingerprint data $V_p$ based on the audio data of the specific television program $D_p$ only after the smart device 41 detects the user specific action. The first server 42 then finds the specific television program $D_p$ corresponding to the audio fingerprint data $V_p$ according to the electronic program guide information and the audio fingerprint data $V_p$. Or, the smart device 41 records the audio data of the specific television program $D_p$ at intervals of the constant time (such as 20 seconds), and then generates the audio fingerprint data $V_p$ based on the audio data, whereby the first server can periodically perform a comparison to check the specific television program $D_p$ which the user 40 is watching. Detailed step flows are the same as the above-mentioned embodiment, so the detailed description is omitted.

In the embodiment of the present disclosure, if the user 40 selects to use the constant length capture rule or the smart length capture rule for video capture, the user 40 can log in the first server 42 via the user interface provided by the first server 42 and select to use the constant length capture rule or the smart length capture rule. Similarly, if the user 40 wants to edit the length of the video fragment $D_v$ captured based on the constant length capture rule or the smart length capture rule, the user 40 can log in the first server 42 via the user interface and then adjust the constant length capture rule or the smart length capture rule.

Figure 5:
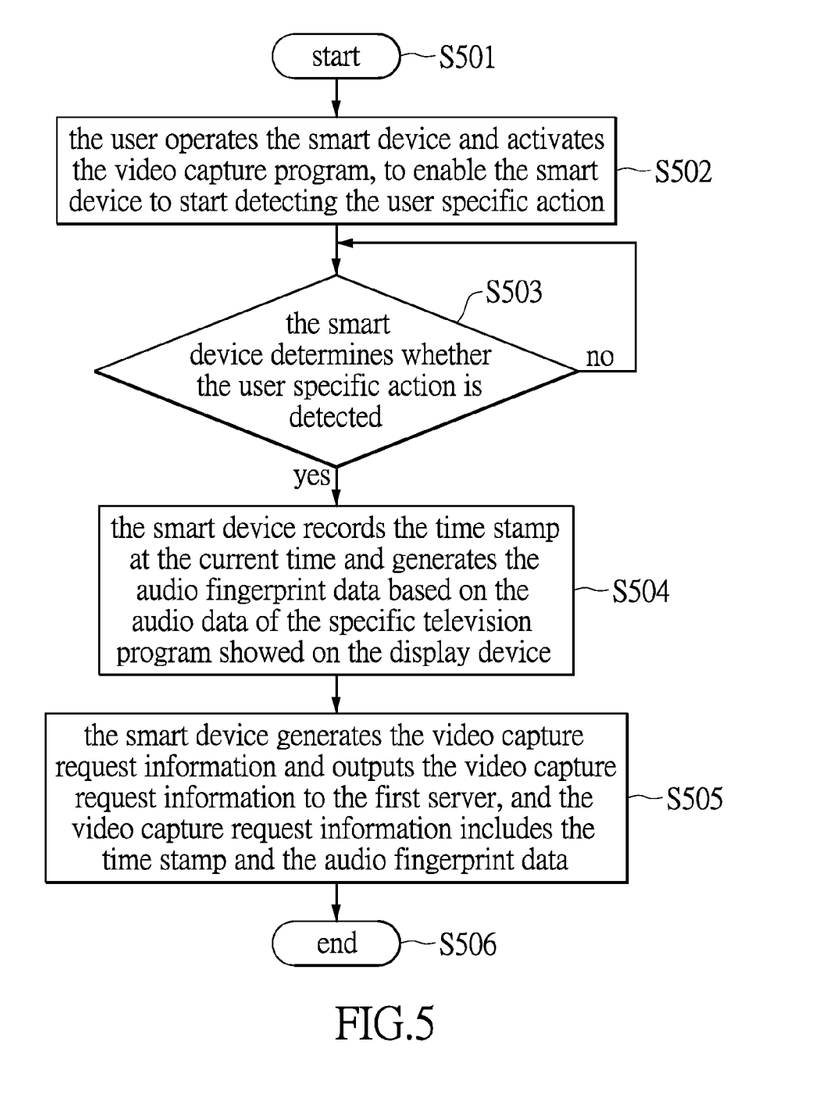
FIG. 5 is a flow diagram of the smart device generating video capture request information in the video capture method of an embodiment of the present disclosure.

Please refer to FIG. 5 which is a flow diagram of the smart device generating video capture request information in the video capture method of an embodiment of the present disclosure. In step S501, a flow of the smart device generating the video capture request information is started. In step S502, the user operates the smart device and activates the video capture program, to enable the smart device to start detecting the user specific action. In step S503, the smart device determines whether the user specific action is detected. When the smart device detects the user specific action, such as an action of shaking the smart device, beating the smart device or emitting specific sound toward the smart device, the step S504 is proceeded. When the smart device does not detect the user specific action, the smart device continues to detect the user specific action. In step S504, the smart device records the time stamp at the current time and generates the audio fingerprint data based on the audio data of the specific television program showed on the display device. In step S505, the smart device generates the video capture request information and outputs the video capture request information to the first server. The video capture request information includes the time stamp and the audio fingerprint data. In step S506, the flow of the smart device generating the video capture request information is ended.

Figure 6:
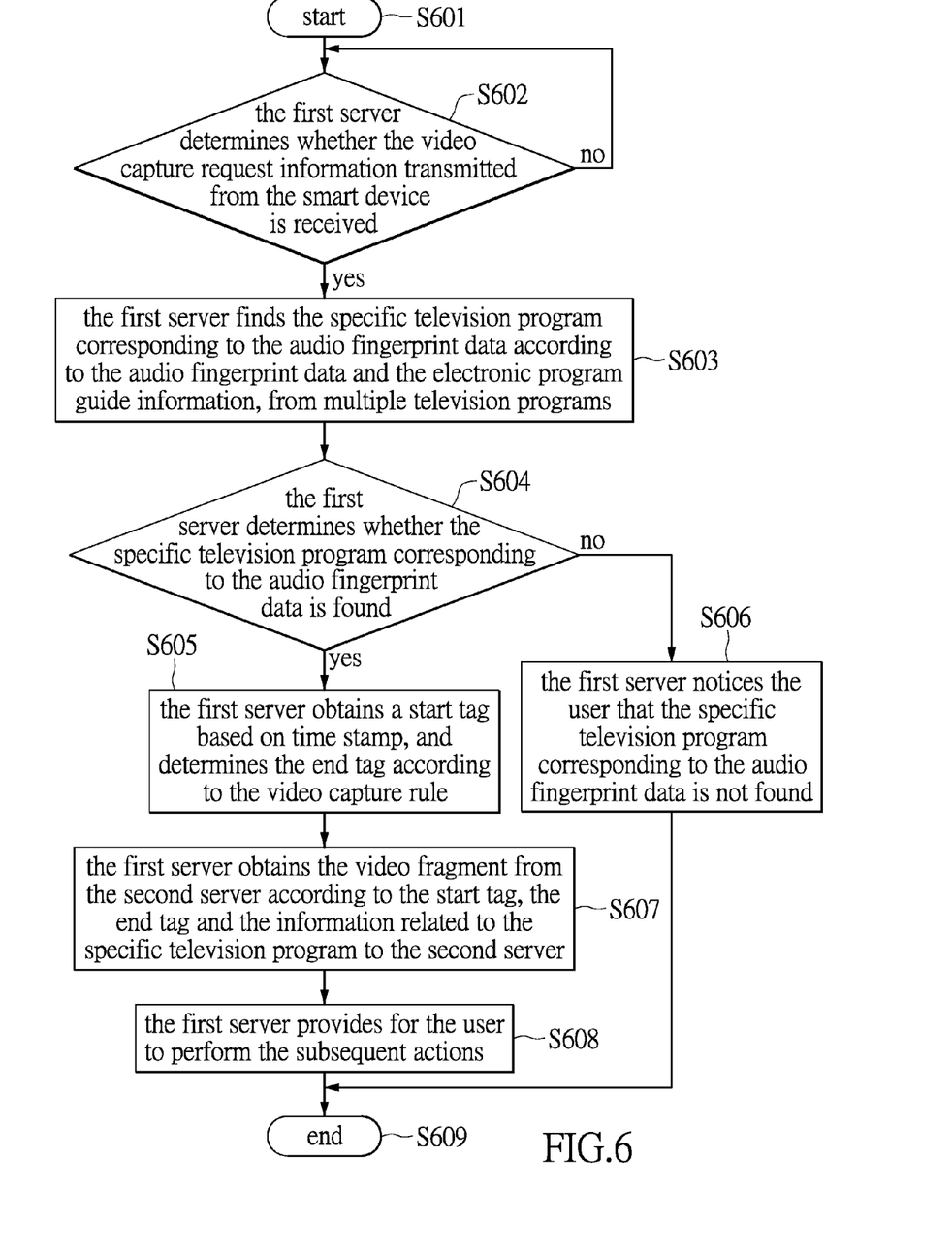
FIG. 6 is a flow diagram of a first server obtaining a video fragment in the video capture method of an embodiment of the present disclosure.

Please refer to FIG. 6 which is a flow diagram of the first server obtaining the video fragment in the video capture method of the present disclosure. In step S601, a flow of the first server obtaining the video fragment is started. In step S602, the first server determines whether the video capture request information transmitted from the smart device is received. When the first server receives the video capture request information transmitted from the smart device, the step S603 is proceeded. When the first server does not receive the video capture request information transmitted from the smart device, the first server continues waiting for the video capture request information transmitted from the smart device. In step S603, the first server finds the specific television program corresponding to the audio fingerprint data according to the audio fingerprint data and the electronic program guide information, from multiple television programs. In detail, the first server obtains the latest N minutes of the audio data of all current television programs according to the electronic program guide information. The first server 12 compares the audio fingerprint data with the latest N minutes of the audio data of all television programs, to find the specific television program corresponding to the audio fingerprint data, from all television programs.

In step S604, the first server determines whether the specific television program corresponding to the audio fingerprint data is found. If the first server succeeds in finding the specific television program corresponding to the audio fingerprint data, the step S605 is proceeded. Otherwise, the step S606 is proceeded. In step S605, the first server obtains a start tag based on time stamp. In detail, the first server traces back the time stamp to a predetermined user response time ago, for use as the start tag. The start tag indicates a starting time of the video fragment which the user wants to capture. The predetermined user response time is a time difference between a time point of the user specific action and a time point of the smart device recording the time stamp. On the other hand, the first server determines the end tag according to the video capture rule. The end tag indicates an ending time of the video fragment which the user wants to capture. The video capture rule can be classified into the constant length capture rule and the smart length capture rule. If the user selects the constant length capture rule, the first server adds the start tag with a constant length of time for use as the end tag. If the user selects the smart length fragment capture, the first server correspondingly determines the end tag according to the program type of the specific television program recorded in the electronic program guide information. In step S606, the first server notices the user that the specific television program corresponding to the audio fingerprint data is not found.

In step S607, the first server outputs the start tag, the end tag and the information related to the specific television program to the second server. The second server captures a length of video fragment according to the start tag, the end tag and the information related to the specific television program, and then returns the video fragment to the first server. In step S608, the first server stores the video fragment and provides for the user to perform the subsequent actions. In detail, the user can log in the first server via the user interface provided by the first server, to watch the video fragment captured, edit the captured range of the video fragment, or perform other editing action on the video fragment. For example if the user thinks that the video fragment captured is not the video fragment which the user wants to capture, the user can delete the video fragment. Or, the user can edit the captured range of the video fragment to enable the first server to generate a new start tag and a new end tag, and then obtain a new video fragment from the second server. Or, the user can operate the first server to transmit the video fragment to the smart device. In step S609, the flow of the first server obtaining the video fragment is ended.

Figure 7:
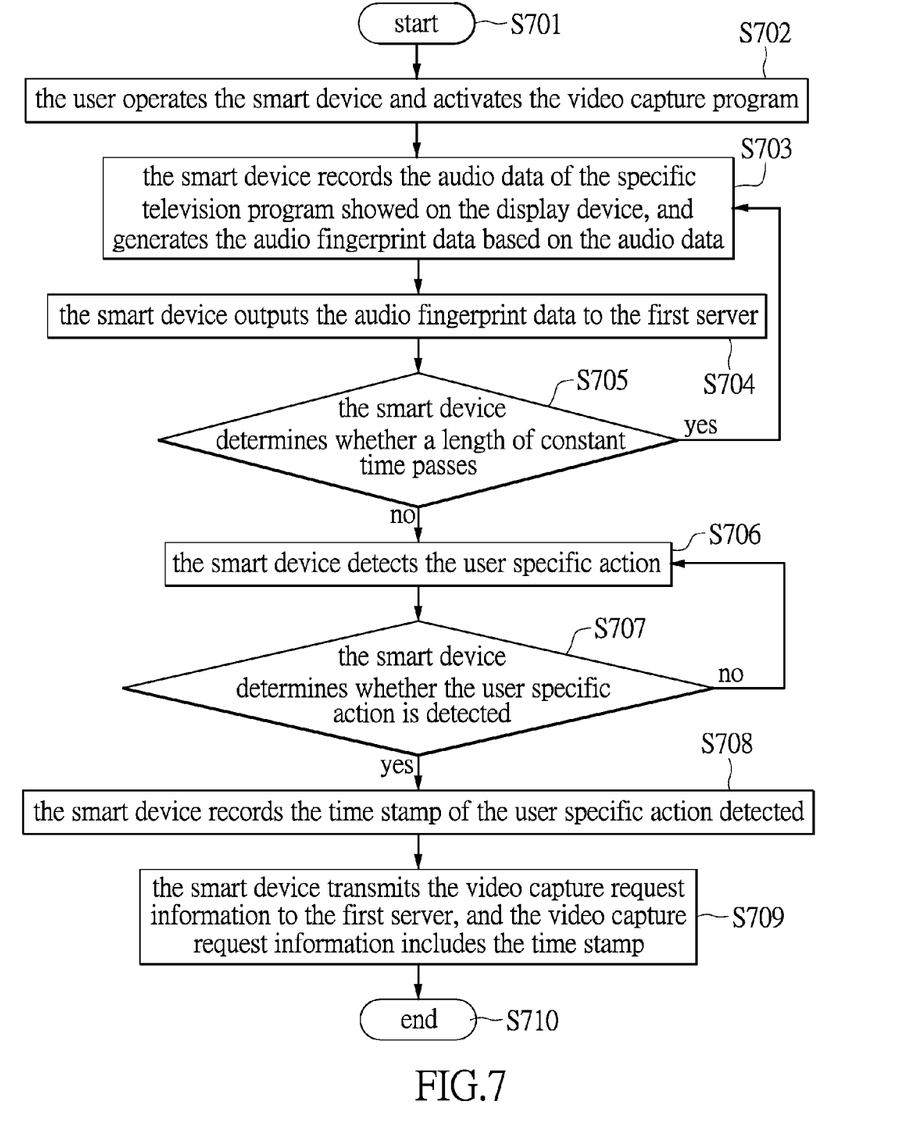
FIG. 7 is a flow diagram of the smart device generating the video capture request information in the video capture method of another embodiment of the present disclosure.

Next, please refer to FIG. 7 which is a flow diagram of the smart device generating video capture request information in the video capture method of another embodiment of the present disclosure. The difference between the flow diagram of the smart device generating video capture request information of the FIG. 5 and the flow diagram of the FIG. 7 is that the smart device of this embodiment records the audio data of the specific television program showed on the display device at intervals of constant time, and generates the audio fingerprint data based on the audio data, and then outputs the audio fingerprint data to the first server.

In step S701, a flow of the smart device generating the video capture request information is started. In step S702, the user operates the smart device and activates the video capture program. In step S703, the smart device records the audio data of the specific television program showed on the display device, and generates the audio fingerprint data based on the audio data. In step S704, the smart device outputs the audio fingerprint data to the first server.

In step S705, the smart device determines whether a length of constant time has passed. When the smart device determines the length of constant time has passed, the step S703 is proceeded, and the smart device again records the audio data of the specific television program showed on the display device, and generates the audio fingerprint data based on the audio data. When the smart device determines the constant time has not passed yet, the step S706 is proceeded.

In step S706, the smart device detects the user specific action. In step S707, the smart device determines whether the user specific action is detected. When the smart device detects the user specific action, the step S708 is proceeded. Otherwise, the step S706 is repeated. In step S708, the smart device records the time stamp of the user specific action detected. In step S709, the smart device transmits the video capture request information to the first server. In this embodiment, it should be noted that the video capture request information includes the time stamp, but not any audio fingerprint data. In step S710, the flow of the smart device generating the video capture request information is ended.

Figure 8:
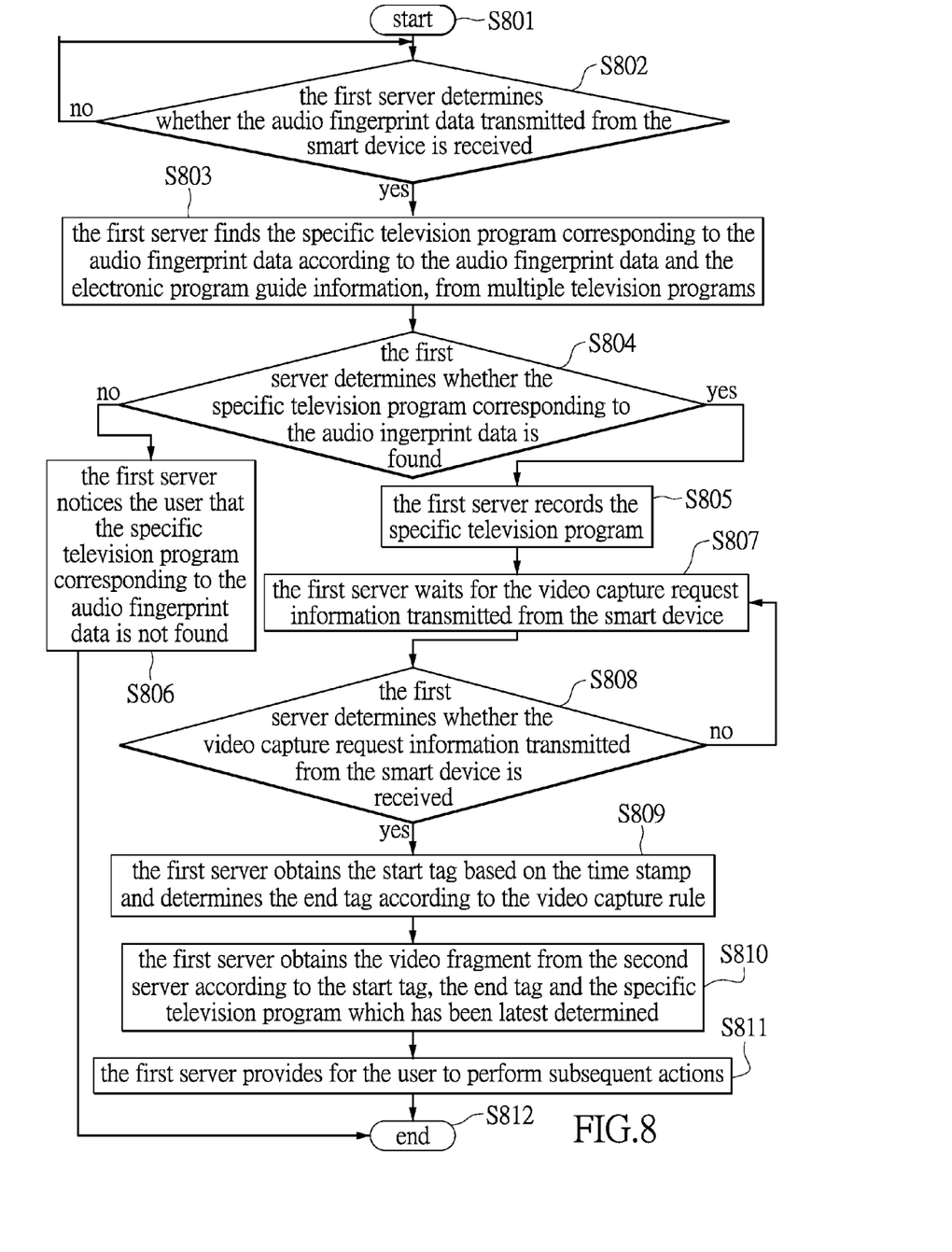
FIG. 8 is a flow diagram of a first server obtaining a video fragment in the video capture method of another embodiment of the present disclosure.

Please refer to FIG. 8 which is a flow diagram of the first server obtaining the video fragment in the video capture method of the present disclosure. In step S801, a flow of the first server obtaining the video fragment is started. In step S802, the first server determines whether the audio fingerprint data transmitted from the smart device is received. When the first server receives the audio fingerprint data transmitted from the smart device, the step S803 is proceeded. When the first server does not receive the audio fingerprint data transmitted from the smart device, the first server continues waiting until the smart device transmits the audio fingerprint data.

In step S803, the first server finds the specific television program corresponding to the audio fingerprint data according to the audio fingerprint data and the electronic program guide information, from multiple television programs. In step S804, the first server determines whether the specific television program corresponding to the audio fingerprint data is found. If the first server succeeds in finding the specific television program corresponding to the audio fingerprint data, the step S805 is proceeded. Otherwise, the step S806 is proceeded. In step S805, the first server records the specific television program found, and the step S807 is proceeded. In step S806, the first server notices the user that the specific television program corresponding to the audio fingerprint data has not been found.

In step S807, the first server waits for the video capture request information transmitted from the smart device. In step S808, the first server determines whether the video capture request information transmitted from the smart device is received. When the first server receives the video capture request information transmitted from the smart device, the step S809 is proceeded. When the first server does not receive the video capture request information transmitted from the smart device, the step S807 is proceeded.

In step S809, the first server obtains the start tag based on the time stamp. On the other hand, the first server determines the end tag according to the video capture rule. The step of obtaining the start tag and the step of determining the end tag according to the video capture rule are similar to the step S605 of the FIG. 6, so the detailed description is omitted. In step S810, the first server outputs the start tag, the end tag and the information related to the specific television program and recorded in step S805, to the second server. The second server captures a length of the video fragment according to the start tag, the end tag and the specific television program which has been latest determined before the user specific action is detected, and returns the video fragment to the first server. In step S811, the first server stores the video fragment and provides for the user to perform subsequent actions. The details of the subsequent actions are similar to the step S608 of the FIG. 6, so the detailed description is omitted. In step S812, the flow of the first server obtaining the video fragment is ended.

According to the above-mentioned content, the video capture method and the system using the same provided by the embodiments of the present disclosure can provide for the user to control the smart device to generate the video capture request information and further obtain the video fragment which the user wants, without complicated operations. On the other hand, by using the electronic program guide information, and the time stamp and the audio fingerprint data contained in the video capture request information, the first server can quickly find the specific television program which the user is watching. Therefore, the consumption of time by the user waiting to obtain the video fragment can be reduced. It is worth mentioning that the first server need not store complete audio data of all television programs, and just reserves the latest N minutes of the audio data of all television programs for finding the specific television program corresponding to the audio fingerprint data. N is larger than zero. Compared with the prior art, the video capture method and the video capture system using the same of the present disclosure further reduce the storage space for all television programs in the first server.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A video capture system, comprising:
a smart device, configured to detect a user specific action, record a time stamp of the user specific action, and generate an audio fingerprint data based on an audio data of a specific television program showed on a display device, wherein the user specific action comprises an action of shaking the smart device, beating the smart device, or emitting a specific sound toward the smart device, wherein the specific sound comprises clapping M times; and a first server, configured for receiving the time stamp and the audio fingerprint data, and for finding the specific television program corresponding to the audio fingerprint data according to the audio fingerprint data and an electronic program guide information, wherein the first server obtains a start tag based on the time stamp, and the start tag is a starting time of a video fragment, wherein the first server does not store complete audio data of all television programs, and just reserves the latest N minutes of the audio data of all television programs, wherein N is larger than zero.

2. The video capture system according to claim 1, wherein when the smart device detects the user specific action, the smart device records the audio data of the specific television program, and generates the audio fingerprint data based on the audio data.

3. The video capture system according to claim 1, wherein the smart device records the audio data of the specific television program at intervals of a constant time, and generates the audio fingerprint data based on the audio data, and the first server finds the specific television program corresponding to the audio fingerprint data according to the audio fingerprint data and the electronic program guide information.

4. The video capture system according to claim 3, wherein when the smart device detects the user specific action, the first server captures the video fragment of the specific television program based on the specific television program being last determined.

5. The video capture system according to claim 1, wherein M is an integer larger than zero.

6. The video capture system according to claim 1, wherein the first server obtaining the start tag based on the time stamp, further calculates the start tag of the video fragment according to the time stamp and a predetermined user's response time.

7. The video capture system according to claim 1, wherein the first server obtains the video fragment of the specific television program from a second server according to the start tag, an end tag and information related to the specific television program, wherein the second server is configured for providing a television signal corresponding to the specific television program to the display device, and the end tag is an ending time of the video fragment which the user wants to capture.

8. The video capture system according to claim 7, wherein the end tag is associated to a video capture rule.

9. The video capture system according to claim 8, wherein when the video capture rule is a constant length capture rule, the first server adds the start tag with a constant length time for use as the end tag.

10. The video capture system according to claim 8, wherein when the video capture rule is a smart length capture rule, the first server determines the end tag according to a program type of the specific television program.

11. A video capture method, adapted for a video capture system, the video capture system comprising a smart device and a first server, and the video capture method comprising:

at the smart device, detecting a user specific action, wherein when the smart device detects the user specific action, the smart device records a time stamp of the user specific action and generate an audio fingerprint data based on an audio data of a specific television program showed on a display device, wherein the user specific action comprises an action of shaking the smart device, beating the smart device, or emitting a specific sound toward the smart device, wherein the specific sound comprises clapping M times;

at the first server, receiving the time stamp and the audio fingerprint data, and finding the specific television program corresponding to the audio fingerprint data according to the audio fingerprint data and an electronic program guide information; and at the first server, obtaining a start tag based on the time stamp, wherein the start tag is a starting time of the video fragment, wherein the first server does not store complete audio data of all television programs, and just reserves the latest N minutes of the audio data of all television programs, wherein N is larger than zero.

12. The video capture method according to claim 11, wherein when the smart device detects the user specific action, the smart device records the audio data of the specific television program, and generates the audio fingerprint data based on the audio data.

13. The video capture method according to claim 11, wherein the smart device records the audio data of the specific television program at intervals of a constant time, and generates the audio fingerprint data based on the audio data, and the first server finds the specific television program corresponding to the audio fingerprint data according to the audio fingerprint data and the electronic program guide information.

14. The video capture method according to claim 13, wherein when the smart device detects the user specific action, the first server captures the video fragment of the specific television program based on the specific television program being last determined.

15. The video capture method according to claim 11, wherein M is an integer larger than zero.

16. The video capture method according to claim 11, wherein at the first server, the step of obtaining the start tag based on the time stamp, comprising:

calculating the start tag according to the time stamp and a predetermined user's response time.

17. The video capture method according to claim 11, wherein the first server obtains the video fragment of the specific television program from a second server according to the start tag, an end tag and information related to the specific television program, wherein the second server is configured for providing a television signal corresponding to the specific television program to the display device, and the end tag is an ending time of the video fragment which the user wants to capture.

18. The video capture method according to claim 17, wherein the end tag is related to a video capture rule.

19. The video capture method according to claim 18, wherein when the video capture rule is a constant length capture rule, the first server adds the start tag with a constant length time for use as the end tag.

20. The video capture method according to claim 18, wherein when the video capture rule is a smart length capture rule, the first server determines the end tag according to a program type of the specific television program.

* * * * *